United States Patent [19]
Smith

[11] Patent Number: 5,685,508
[45] Date of Patent: *Nov. 11, 1997

[54] PIPE HANGING AND ROOFTOP LOAD SUPPORTING SYSTEM

[75] Inventor: Robert L. Smith, Odessa, Tex.

[73] Assignee: Portable Pipe Hangers, Inc., Houston, Tex.

[*] Notice: The term of this patent shall not extend beyond the expiration date of Pat. No. 5,217,191.

[21] Appl. No.: 256,220

[22] PCT Filed: Jan. 18, 1994

[86] PCT No.: PCT/US94/00664

§ 371 Date: Jul. 5, 1994

§ 102(e) Date: Jul. 5, 1994

[87] PCT Pub. No.: WO95/19519

PCT Pub. Date: Jul. 20, 1995

[51] Int. Cl.⁶ .................................................. F16L 3/16
[52] U.S. Cl. .................................................. 248/55; 248/49
[58] Field of Search .................................... 248/49, 55, 74.1, 248/65, 68.1, 70, 62, 59, 58

[56] References Cited

U.S. PATENT DOCUMENTS

| | | |
|---|---|---|
| 1,541,129 | 2/1925 | Farley . |
| 2,106,956 | 2/1938 | Nakamura . |
| 2,675,132 | 4/1954 | Susil ........................ 248/55 X |
| 3,138,659 | 6/1964 | Cognet et al. . |
| 3,458,964 | 8/1969 | Gulliams ................... 248/70 X |
| 3,576,304 | 4/1971 | Gillemot . |
| 4,502,653 | 3/1985 | Curtis, Jr. . |
| 4,530,478 | 7/1985 | McClellan ................ 248/55 |
| 5,028,019 | 7/1991 | Hardtke ................... 248/49 X |
| 5,217,191 | 6/1993 | Smith ........................ 248/55 |

FOREIGN PATENT DOCUMENTS

| | | |
|---|---|---|
| 2023332 | 2/1992 | Canada ...................... 248/49 |
| 746731 | 3/1956 | United Kingdom . |
| 1309808 | 3/1973 | United Kingdom ........ 248/49 |

OTHER PUBLICATIONS

Modern Hanger Corp, Catalog, 1953, p. 90, Fig. 661 (single roller hanger).

*Primary Examiner*—Alvin C. Chin-Shue
*Attorney, Agent, or Firm*—Brooks & Kushman P.C.

[57] ABSTRACT

Apparatus and method for hanging pipe including a portable weight distribution base (26), a frame (20) attachable to the base an adjustable yoke (40) attachable to the frame for suspending the pipe (14).

14 Claims, 8 Drawing Sheets

FIG. 10a

| Case I: | Type PS-E Custom<br>Two Bases<br>Two 6-inch (nominal)<br>Standard Steel Pipes<br>Capacity Water Flow | | PIPE HANGER SPACING | | |
|---|---|---|---|---|---|
| | | | 6 FT. | 8 FT. | 10 FT. |
| TOTAL LOAD/BASE (POUNDS)<br>including pipe, water | | | 189 LB. | 252 LB. | 315 LB. |
| UNIFORM LOAD/BASE<br>including base, frame, pipe, water<br>10-inch by 12-inch by 2 1/2-inch base<br>(POUNDS PER SQUARE FOOT) | | | 258 LB/SF | 334 LB/SF | 409 LB/SF |
| UNIFORM LOAD/BASE<br>including base, frame, pipe, water<br>12-inch by 20-inch by 2 1/2-inch base<br>(Pounds per Square Foot) | | | 147 LB/SF | 187 LB/SF | 227 LB/SF |
| UNIFORM LOAD COMPARISON<br>VS. TIMBER "SLEEPER"<br>including pipe, water and specified<br>length of a 4 by 4 timber sleeper | 2 FT. | | 648 LB/SF | 864 LB/SF | 1080 LB/SF |
| | 4 FT. | | 324 LB/SF | 432 LB/SF | 540 LB/SF |
| | 6 FT. | | 216 LB/SF | 288 LB/SF | 360 LB/SF |

FIG. 10b

| Case II: | Type PS-E Custom<br>Two Bases<br>Two 5-inch (nominal)<br>Standard Steel Pipes<br>Capacity Water Flow | | PIPE HANGER SPACING | | |
|---|---|---|---|---|---|
| | | | 6 FT. | 8 FT. | 10 FT. |
| TOTAL LOAD/BASE (Pounds)<br>including pipe, water | | | 140 LB. | 186 LB. | 233 LB. |
| UNIFORM LOAD/BASE<br>including base, frame, pipe, water<br>10-inch by 12-inch by 2 1/2-inch base<br>(Pounds per Square Foot) | | | 199 LB/SF | 255 LB/SF | 311 LB/SF |
| UNIFORM LOAD/BASE<br>including base, frame, pipe, water<br>12 inch by 20 inch by 2-1/2 inch base<br>(Pounds per Square Foot) | | | 116 LB/SF | 145 LB/SF | 175 LB/SF |
| UNIFORM LOAD COMPARISON<br>VS. TIMBER "SLEEPER"<br>including pipe, water and specified<br>length of a 4 by 4 timber sleeper | 2 FT. | | 480 LB/SF | 638 LB/SF | 799 LB/SF |
| | 4 FT. | | 240 LB/SF | 319 LB/SF | 399 LB/SF |
| | 6 FT. | | 160 LB/SF | 213 LB/SF | 266 LB/SF |

FIG.10c

| Case: III: | Type PS<br>One Base<br>One 6-inch (nominal)<br>Standard Steel Pipe<br>Gas | | PIPE HANGER SPACING | | |
|---|---|---|---|---|---|
| | | | 6 FT. | 8 FT. | 10 FT. |
| TOTAL LOAD/BASE (Pounds) | | | 156 LB | 194 LB | 232 LB |
| UNIFORM LOAD/BASE<br>including base, frame, pipe, gas<br>12-inch by 20-inch by 2 1/2-inch base<br>(Pounds per Square Foot) | | | 99 LB/SF | 123 LB/SF | 148 LB/SF |
| UNIFORM LOAD COMPARISON<br>VS. TIMBER "SLEEPER"<br>including pipe, water and specified<br>length of a 4 by 4 timber sleeper | | 2 FT. | 267 LB/SF | 333 LB/SF | 398 LB/SF |
| | | 4 FT. | 134 LB/SF | 166 LB/SF | 199 LB/SF |
| | | 6 FT. | 89 LB/SF | 111 LB/SF | 133 LB/SF |

PIPE HANGING AND ROOFTOP LOAD SUPPORTING SYSTEM

1. Field of the Invention

This invention relates to Applicant's invention of U.S. Pat. No. 5,217,191 and lies in the field of hanging pipe and of supports for hanging pipes and other rooftop loads.

2. Background of the Invention

It is common in commercial and industrial surroundings for there to be various operating pipes and conduits exposed to the elements that extend along the ground and over the tops of roofs. For instance, these pipes and conduits may be connected to an air conditioning unit mounted on a building roof, or to various other service units. Frequently the pipes carry fluids where operating temperature fluctuates over a wide range.

With temperature changes and/or with normal changes in the operating system parameters, the pipes expand and contract greatly, sometimes as much as 1 to 1.5 inches per linear foot. The support for these pipes as they run over the ground and/or over a roof must not only sustain the pipe load but also must be sufficiently flexible to withstand the expansion and contraction caused by fluctuation in operating parameters and the weather.

In the roof environment it is common practice for operating pipes to be supported by blocks of wood. The blocks are placed at intervals along the pipe track. They fit between the roof surface and the pipes. Partly because of the large contact surface area between a block and a pipe, the blocks frequently move. After a period of time, the movement of the block against a roof surface can cause damage. This usually results in a leak and requires expensive roof repair. Blocks have been nailed to the roof to prevent their movement, but the nails and the wood have proven to deteriorate in a relatively short time period. The blocks then break loose as before, and the system frequently results in the roof leaking about the nail holes in addition.

There is available a pipe holder for mounting on a roof that has a shaft mounted pulley or roller on which the pipe can rest and roll as it expands and contacts. This helps to prevent permanent problems due to the contraction and expansion of the pipes. It is still necessary with this system, however, to make holes in the roof for mounting purposes. Furthermore, the device is expensive. If many holders are required, they can cost more than a number of later roof repairs. As a result, this proposed solution to the problem of rooftop pipe support has not achieved a great deal of commercial success.

A non-fixed pipe-supporting device for roofs has been developed that comprises a substantially flat bottomed base having a support structure rising from the base. The design offers a channel or V-shaped support arrangement and purports to distribute the weight of the pipe over the bottom of the base. This system, however, teaches no underlying pad and more importantly, does not teach, suggest or propose to be capable of supporting pipe hung with a yoke. Especially in the environment of roofs, where pipe contraction and expansion is magnified, pipes not permitted to move sufficiently freely relative to their support can cause substantial damage to underlying surfaces.

The enhanced freedom of movement relative to the support obtained from hanging pipe from a suspended yoke is recognized. Hanging pipe via an adjustable yoke can accommodate greater pipe expansion and contraction in both axial and radial directions as well as torquing and skewing motions. However, the existing art teaches that such yokes are always secured to a firm overhead foundation, such as a ceiling, or suspended from a frame that is secured to a firm fixed foundation, such as a wall or a buried ground base.

In the roof environment, utilizing fixed bases would require holes to be placed in the roof surface. As discussed above, holes lead to leaks, a definite disadvantage. In general, fixed bases also lack a flexibility of adjustment during setup and-use and are expensive to reconfigure, a further disadvantage vis a vis portable bases.

A system for the use of a yoke for hanging pipe suspended from a frame attached to a portable base has not been taught or known in the art prior to this invention. There is no indication that anyone in the industry thought it feasible. It is herein disclosed, not only in a roof environment where its advantages are ample, but also in a ground based system. Even there it offers advantages of ease of operation and flexibility. The absence of such teaching and practice in the prior art, where its efficiency and effectiveness would be clear, testifies to the current belief in the industry that pipe can not be safely and securely hung from non-fixed bases.

The present invention discloses laying pipe with a yoke suspended from a frame attached to a portable base and further to utilize a set of such supports to hang pipe over a distance. On a roof surface the base is to be placed upon a pad, preferably adhered to the surface of the roof but alternately possibly adhered to the bottom of the base. The base is to distribute the weight of the pipe. The yoke should be adjustable.

It is this inventor's discovery that appropriate portable weight distributing bases do not impermissibly move out of position. The base system can be assembled quickly on location while being shipped in a broken down configuration. During set up and after use, the system can be adjusted as well as reconfigured, and the system can be utilized on the ground as well as on roof surfaces. Slanting surfaces can be compensated for by a wedge insert under the base. The combined adaptability, effectiveness, and efficiency of the system yields significant commercial advantages.

Not only will the instant system prove advantageous in supporting pipes over all sorts of surfaces, the base system involving a portable base resting on a pad adhered to the roof will also prove advantageous for supporting other rooftop loads, such as an air conditioning system.

The term "portable," as used herein with reference to a base, indicates that the base rests upon an underlying surface but is not permanently affixed to that surface. The base remains mobil, movable, and adjustable, in setup and afterwards. A portable base distinguishes itself from bases comprised of ceilings or walls or floors and from bases fixed into the ground.

SUMMARY OF THE INVENTION

The instant invention discloses apparatus and method for hanging pipe comprising a portable weight distributing base having a frame attachable to the base. The frame and base combination have a means for assembly and disassembly. An adjustable yoke attaches to the frame for suspending pipe.

The invention includes a pad for resting between the base and a roof surface, the pad either adhering to a portion of the roof surface or to the lower surface of the base by an adhesive.

The base may be comprised of concrete, steel, rubber, reclaimed rubber, plastic or fiberglass and resin.

A system for hanging pipe is disclosed that includes suspending a pipe in a plurality of yokes, adjustably attaching the yokes to frames, attaching the frames to portable weight distributing bases and distributing the bases along a path of the pipe. If the pipe is hung over a roof surface, the system includes adhering a plurality of foot pads to a roof, or possibly to the bases, and resting the bases upon the foot pads.

The invention also discloses a foundation apparatus for supporting rooftop loads comprising a pad adhered to a roof and a set of portable weight distributing bases resting upon the pad or pads.

DESCRIPTION OF THE DRAWINGS

The accompanying drawings illustrate various features of the invention.

FIGS. 10A–C comprises three tables giving load information based upon different bases and different pipes.

DETAILED DESCRIPTION OF THE PREFERRED EMBODIMENT

Figure 1:
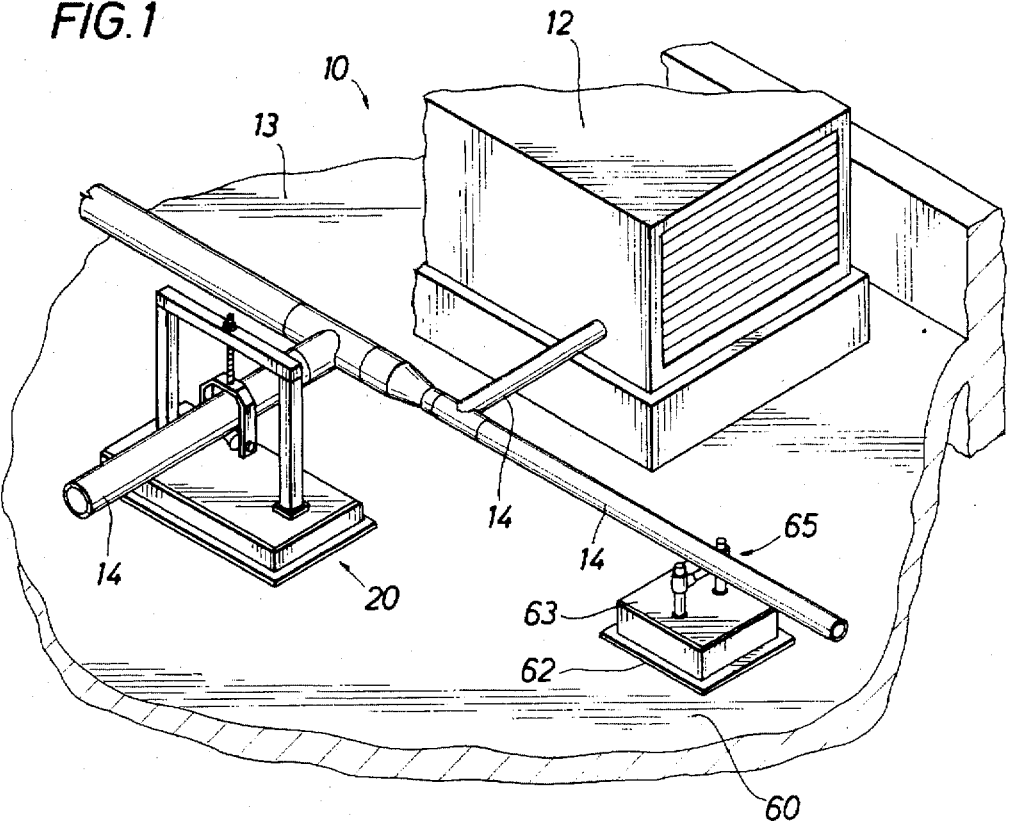
FIG. 1 illustrates a partial roof segment with installation of piping using the inventive apparatus.

With reference to FIG. 1, roof installation 10 includes air conditioner 12 seated or mounted on roof section 13. For proving service to the air conditioner 12 and other similar units on the roof (not shown), a pipe network 14 is provided and utilizes yoke pipe support pedestal 20, as well as yokeless pipe support pedestal 65.

Figure 2:
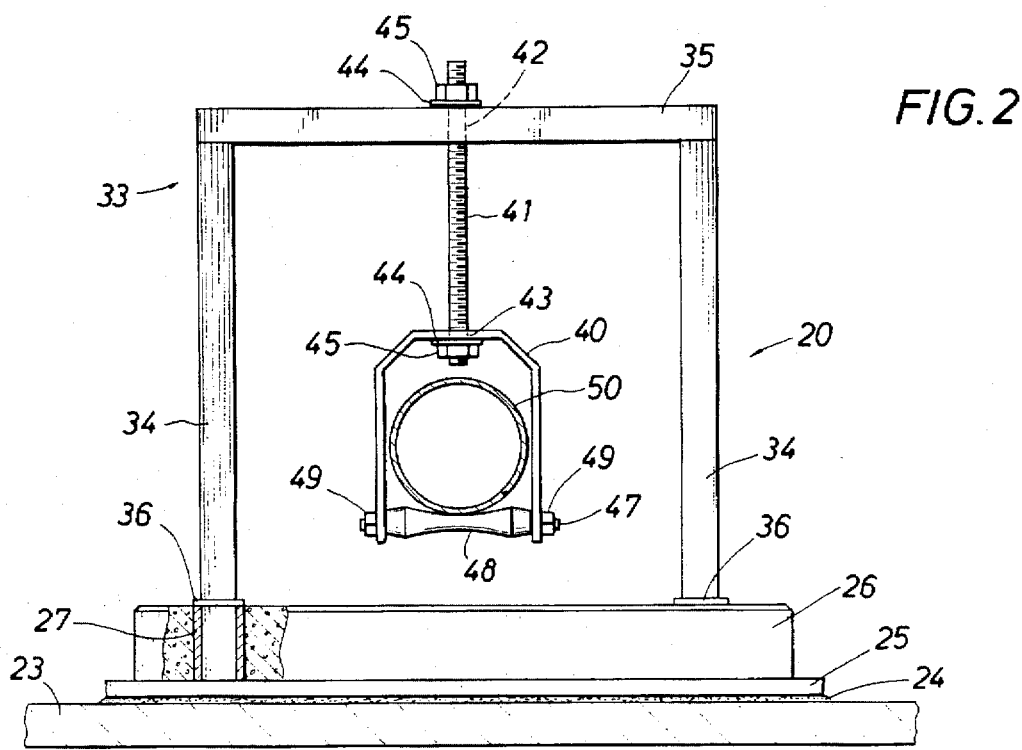
FIG. 2 is a side elevation view of one apparatus having an adjustable overhead yoke showing a section through the roof and a precast concrete base broken away.
Figure 3:
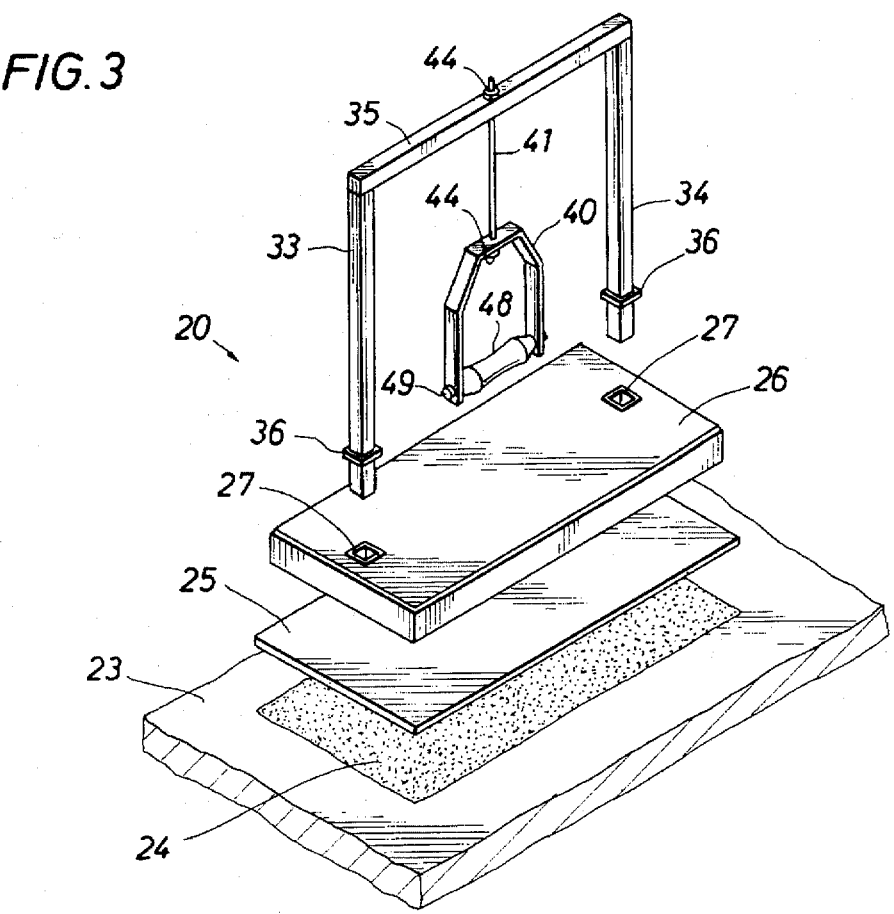
FIG. 3 is an expanded view of the apparatus of FIG. 2 illustrating a segment of roof, adhesive, a concrete reinforced base and an overhead yoke.

Referring now to FIGS. 2 and 3, the details of the yoke pipe support pedestal 20 are described. Referring specifically to FIG. 3, yoke pedestal 20 is illustrated in an exploded view of its components and attachment to a roof section 23. The roof section 23 has an adhesive 24 applied to a clean place on the roof section 23, and foot pad 25 is placed on the adhesive 24 to secure it to the roof section 23. Base 26 is then seated on the foot pad 25. The base is of sufficient mass that it uniformly compresses the isolation or foot pad 28 and will remain in place without further attachment to the roof. Pedestal 20 has a frame 33 which comprises a pair of side posts 34 and cross bar 38. Referring to FIG. 2, the pedestal 20 is illustrated with a broken away section through one tubular steel insert 27 illustrating that side post 34 of yoke support bracket 33 seats in tubular insert 27. Collar 36 transfers the weight from frame 33 to base 26. The tables of FIG. 10, discussed below, compare the load distributing characteristics of various bases.

Yoke 40 is suspended from cross bar 35 of yoke support frame 33 by a threaded rod 41, extending through hole 42 in cross bar 35 and through hole 43 in yoke 40. One end of threaded rod 41 is secured to the yoke 40 by washers 44 and nuts 48 and the other end of threaded rod 41 is secured to the cross bar 35 with washers 44 and nuts 45. A conventional pipe support roller 48 is secured through holes 46 in yoke 40 by nuts 49 on threaded rod 47, which securing means retains pipe support roller 48 while permitting free rotation thereof corresponding to movement of pipe 80. It will be understood that nuts 45 on threaded rod 41 may be adjusted to raise or lower the roller 48 of yoke 40 and thus adjust for leveling pipe 14 to equalize and distribute the pipe load throughout a pipe support system.

Furthermore, hole 42 can be designed to be of a size to permit rod 41 room to move laterally side to side and front to back and to rotate, thereby permitting the yoke to accommodate expansion, contraction, rotational torquing and skewing of the pipe.

Figure 4:
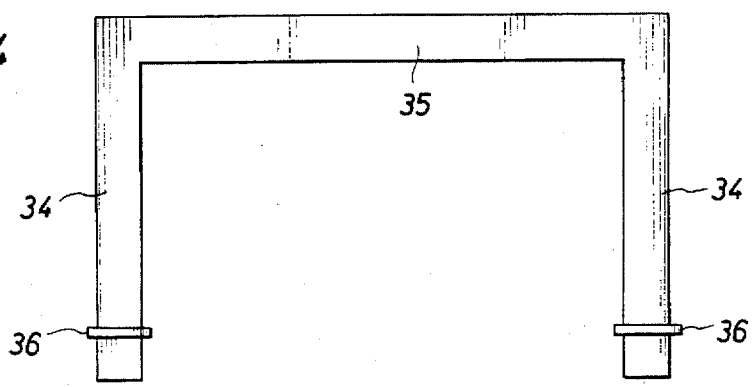
FIG. 4 is the side elevation of the frame of FIGS. 2 and 3 illustrating a support collar.

FIG. 4 illustrates one embodiment of frame 33. Frame 33 of FIGS. 4 can be attached to a base 26 by inserting end portions of side rods 34 into tubular inserts designed for such purpose in the base. Collar 36 affixed to side bars 34 is one means for frame 33 to transfer its weight to base 26. Frame 33 could come in one piece or more than one piece. For instance, frame 33 could telescope together at some place along its sides or top. Alternately, portions of frame 33 could be permanently fixed to the top of a base 26, while other portions of frame 33 can be subsequently attached. It is preferable that frame 33 can be disassembled from base 26 as well as assembled in order to provide for efficient design and reconfiguration.

Figure 5:
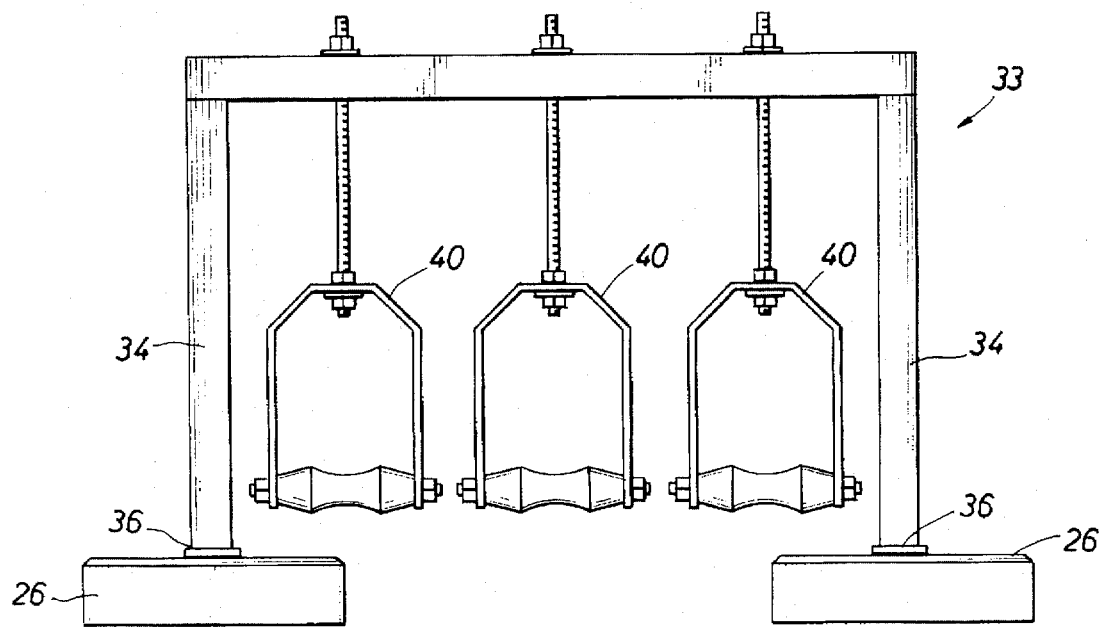
FIG. 5 illustrates an embodiment of the apparatus wherein the frame rests on a pair of bases and supports three yokes.

FIG. 5 illustrates an alternate embodiment of the present invention. In the apparatus of FIG. 5 frame 33 is inserted into a pair of weight distributing bases 26. Collar 36, again, indicates how the load carried by frame 33 is transferred to bases 26. Three adjustable yokes 40 are shown suspended from frame 33.

It is important that the bases sufficiently distribute the weight. FIG. 10 contains tables illustrating limited load calculations for three cases. The load is particularly pertinent for roof deck designs, but it is also important to understand for ground-based designs. The loads are calculated for both single and dual base assemblies. For comparison purposes, the identical loads are calculated for timber sleepers used in the current art in roof deck assemblies. In preparing the tables the area of the assembly base was calculated by multiplying the assembly's width by its length. No reduction in area was included to account for rounded corners. The unit weight of the assembly frame and base was based on information of the inventor and the unit weight of standard steel pipe was obtained from published data in the Pipe Fitter's Handbook published by Grinell.

Figure 6:
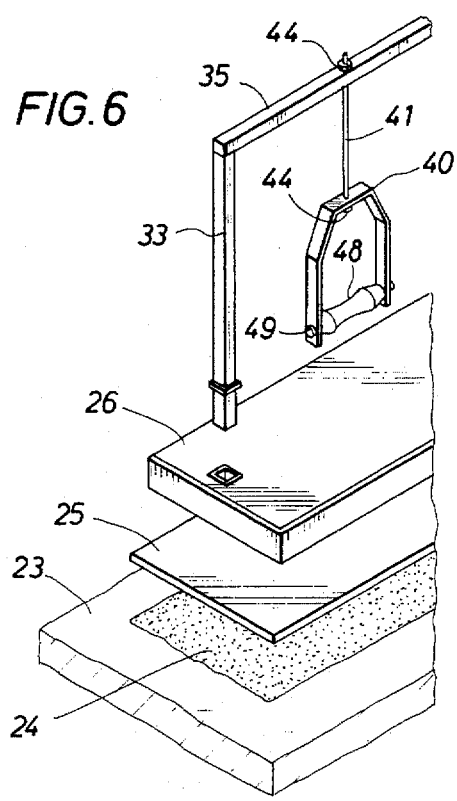
FIG. 6 is similar to FIG. 3 but helps illustrate in FIGS. 6a through 6c different compositions of the base, such as concrete, rubber and plastic.
Figure 6A:
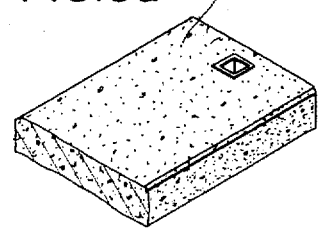
FIG. 6d illustrates an insert that may be used on slanting roofs.
Figure 6B:
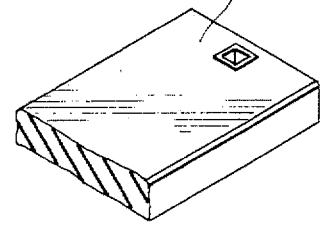
Figure 6C:
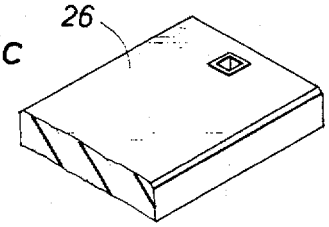

FIG. 6 repeats the illustration of FIG. 3. FIGS. 6a, 6b and 6c indicate that the base of FIG. 6 could be comprised of concrete, rubber or reconstituted rubber and plastic or fiberglass and resin respectively.

Figure 6D:
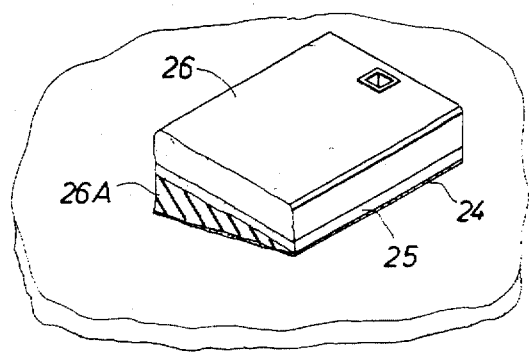

FIG. 6d illustrates insert 26A. Insert 26A, indicated as comprised of rubber, illustrates the application of the present invention in the case in which the roof, as indicated by roof section 23 slants. In such situation wedge-shaped insert 26A can serve to level assembly 26.

Figure 7:
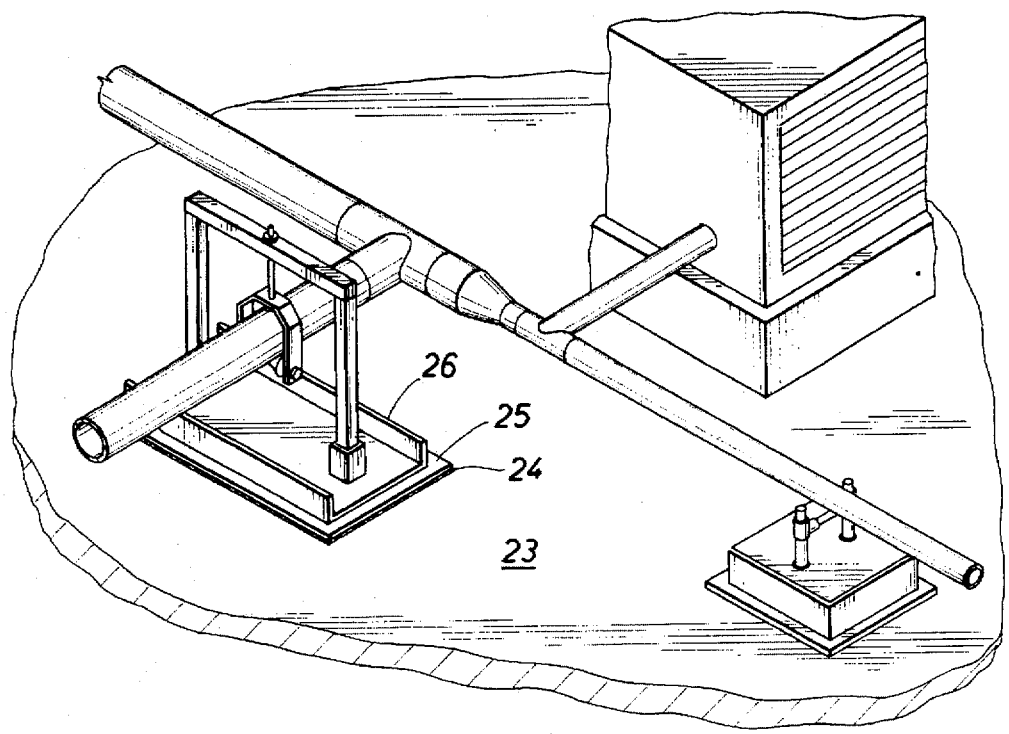
FIG. 7 is similar to FIG. 1 but illustrates a base comprised of channel steel.
Figure 8:
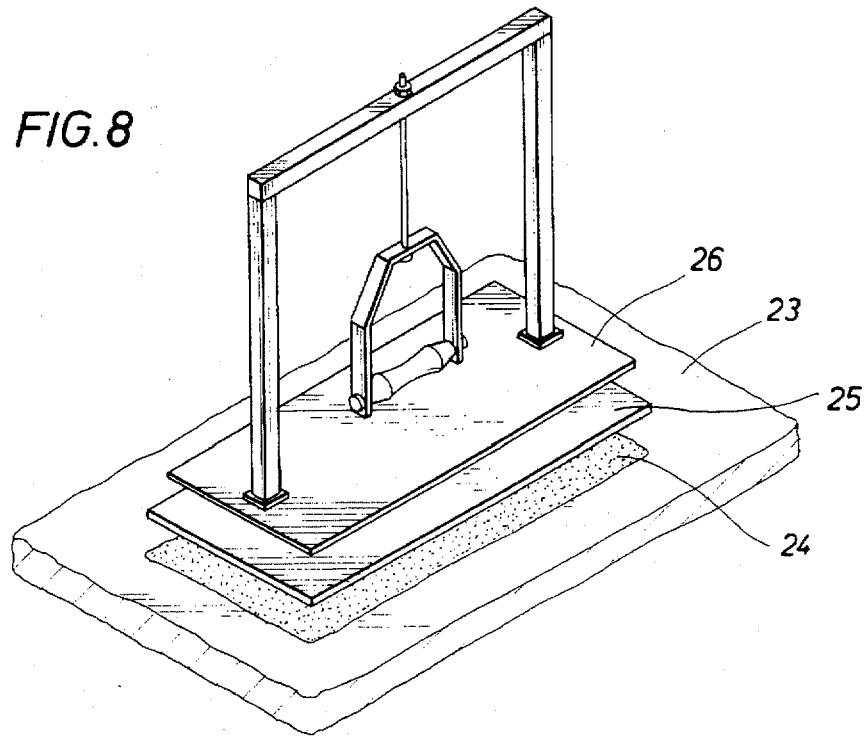
FIG. 8 similar to FIG. 2 but illustrates a base comprised of steel plate.

FIG. 7 and FIG. 8 illustrate base 26 comprised of steel. In FIG. 7 base 26 is comprised of a piece of steel channel, having flanged edges. In FIG. 8 base 26 as illustrated is comprised of sheet steel.

Figure 9:
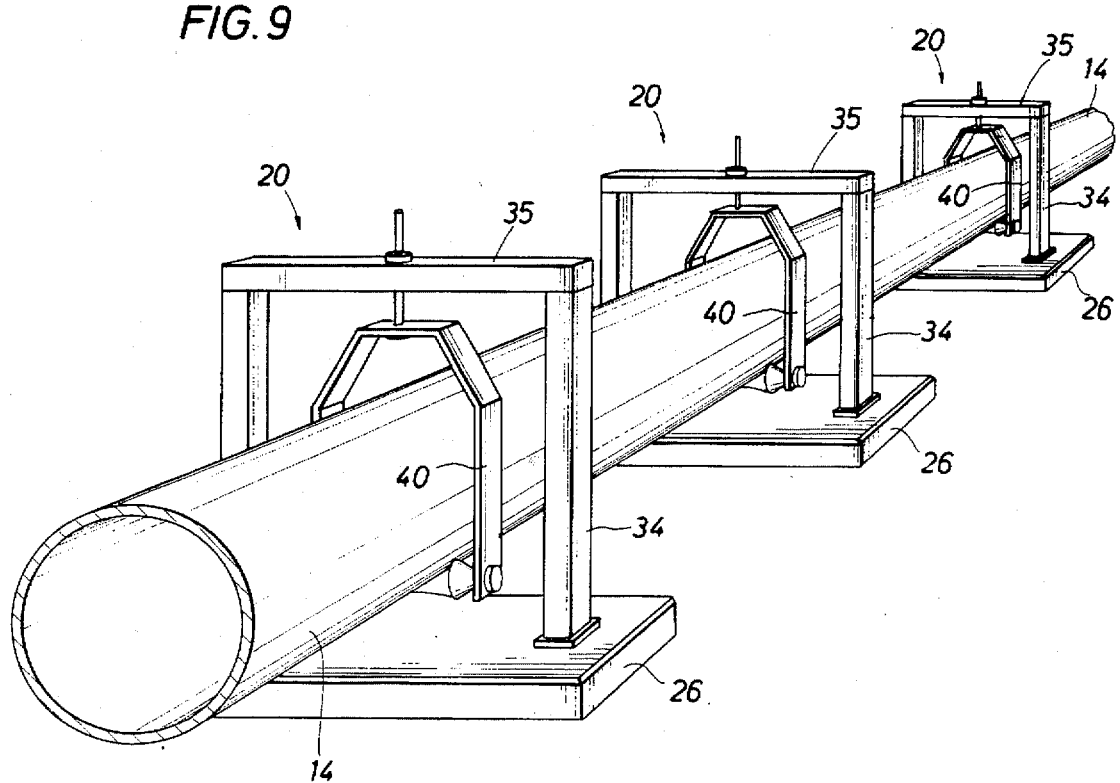
FIG. 9 illustrates the system of the present invention where a length of pipe is hung using a plurality of the pipe hanging apparatus.

FIG. 9 illustrates the apparatus and method of the present invention wherein a plurality of base, frame and yoke assembles are utilized. The application of FIG. 9 could be installed Upon a roof deck. In such case foot pads would be utilized under bases 26. In a ground based system there is no need for such pads.

FIG. 10, discussed above, relates to FIG. 9 in that it indicates factors to consider in determining pipe hanger spacing between assembles 20. As a general rule of thumb in a roof deck situation, loads in excess of five pounds per square inch are avoided.

Figure 11:
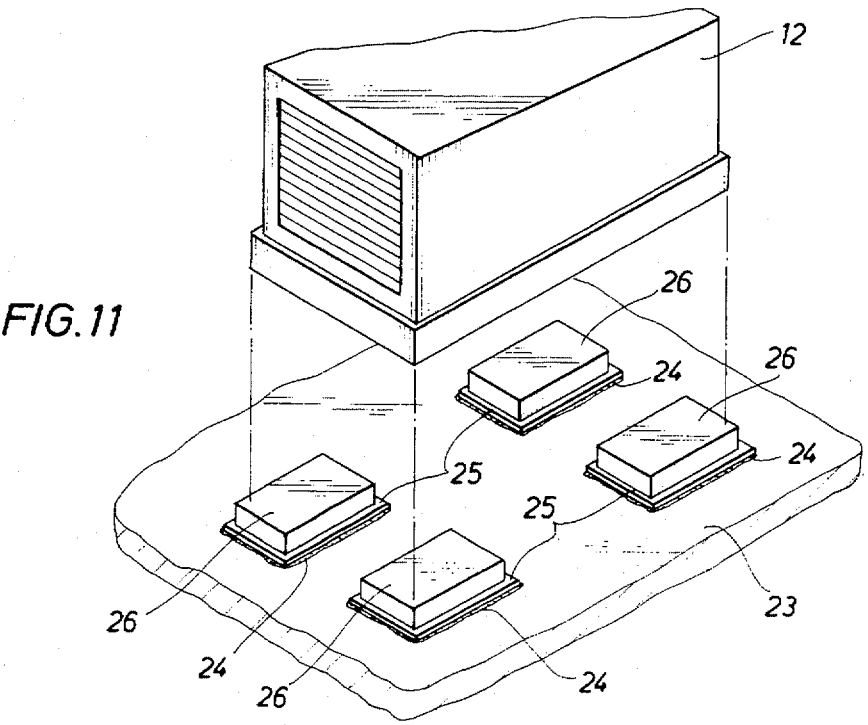
FIG. 11 illustrates use of the present invention to support other roof deck loads.

FIG. 11 indicates the application of the present invention in roof deck situation in order to bear a load other than pipe. FIG. 11 indicates a section of roof 23 having four areas of adhesive 24 applied, four pads 25 adhered to the adhesive and receiving four bases 26. Air conditioning load 12 is indicated as potentially resting upon four bases 26.

The invention disclosed herein is illustrated and described with specific reference to embodiments thereof presently contemplated as the best mode for carrying out the invention. However, it should be understood that various materials of construction other than those described herein which perform the same function may be utilized. It should be understood that various changes may be made in adapting the invention to different embodiments without departing from the broader inventive concepts disclosed herein and set forth in the claims that follow.

I claim:

1. A pipe hanging system for supporting a pipe upon a flat mounting surface, the system comprising:
    a compressible pad having pad upper surface, and a pad lower surface for engaging the flat mounting surface;
    a base having a generally planar base lower surface cooperating with the pad upper surface for distributing a load over a region of the flat mounting surface which is sufficiently large to maintain the maximum unit load per unit area within an acceptable limit, the base having a base upper surface with at least one opening formed therein;
    a frame having at least one post provided with an end received within the at least one opening of the base to securely orient the at least one post perpendicular to the base lower surface; and
    a yoke adjustable mounted to the frame for supporting the pipe at a selected height in order to level the pipe and distribute the load thereof along the flat mounting surface, wherein the frame is a U-shaped member having a pair of posts and further including a cross-member extending between the pair of posts and a downwardly depending threaded rod attached to the cross-member and extending between the cross member and the yolk for accommodating vertical adjustment and for allowing limited relative transverse movement.

2. The system of claim 1 wherein the at least one post has a rectangular cross-section and the at least one opening is a rectangular aperture for receiving the at least one post.

3. The system of claim 1 further comprising a tubular insert located in the at least one opening for receiving the at least one post.

4. The system of claim 1 wherein the at least one post includes a collar portion engaging the base upper surface proximate the opening to transfer load to the base.

5. The system of claim 1, further including a wedge insert having a lower wedge surface and an angled wedge surface, the lower wedge surface engaging the pad upper surface and the angled wedge surface engaging the base lower surface, for levelling the system when the flat mounting surface is slanted.

6. The system of claim 1 wherein the base is formed of a material selected from a group consisting of concrete, steel, rubber, plastic and fiberglass.

7. A pipe hanging system for supporting a section of pipe upon a flat mounting surface formed on a generally flat roof, the system comprising:
    a pair of compressible pads, each of the pair of compressible pads having a pad lower surface for engaging the flat mounting surface and a pad upper surface;
    a pair of bases, each of the pair of bases corresponding to a respective one of the pair of compressible pads, each of the pair of bases having a substantially flat base lower surface cooperating with the pad upper surface for distributing a load over a region of the flat mounting surface which is sufficiently large to maintain the maximum unit load per unit area within an acceptable limit;
    a U-shaped frame having a pair of posts spaced apart from each other, a cross-member extending between the pair of posts and a downwardly depending threaded rod attached to the cross-member, each of the pair of posts having an end affixed to a corresponding one of the pair of bases; and
    at least one yoke for supporting the section of the pipe, the yoke mounted to the threaded rod depending from the cross-member for accommodating vertical adjustment of the yoke and the section of the pipe which allows limited relative transverse movement between the yoke and the frame.

8. The system of claims 1 or 7 further comprising an adhesive for permanently affixing the pad lower surface to the flat mounting surface.

9. The system of claim 7, wherein each of the pair of bases is formed of concrete.

10. The system of claim 7, wherein each of the pair of bases is formed of steel.

11. The system of claim 7, wherein each of the pair of bases is formed of rubber.

12. The system of claim 7, wherein each of the pair of bases is formed of plastic.

13. The system of claim 7, further including at least one wedge insert cooperating with at least one of the pair of bases, the at least one wedge insert having a lower wedge surface and an angled wedge surface, the lower wedge surface engaging the pad upper surface and the angled wedge surface engaging the base lower surface, for levelling the system when the flat mounting surface is slanted.

14. The system of claim 7, wherein each of the pair of bases is spaced apart from the other.

* * * * *